Feb. 20, 1962     H. G. HAHN     3,022,198

COATING OF SHAPED ARTICLES

Filed July 5, 1960

```
┌─────────────────────────────────────┐
│ Treating solution of 15% to 25%     │
│ of a copolymer of acrylonitrile     │
│ and 85% to 75% vinylidene           │
│ chloride in ethyl acrylate          │
└─────────────────────────────────────┘
                  │
                  ▼
        ┌──────────────────────────┐
        │ Treating of alkenyl      │
        │ aromatic resin article   │
        └──────────────────────────┘
                  │
                  ▼
           ┌──────────────────┐
           │ Removal of       │
           │ volatile solvent │
           └──────────────────┘
```

INVENTOR.
Harold G. Hahn
BY
Robert B. Ingraham
AGENT

United States Patent Office 3,022,198
Patented Feb. 20, 1962

3,022,198
COATING OF SHAPED ARTICLES
Harold G. Hahn, Midland, Mich., assignor to The Dow Chemical Company, Midland, Mich., a corporation of Delaware
Filed July 5, 1960, Ser. No. 40,548
5 Claims. (Cl. 117—138.8)

This invention relates to a method of treating the surfaces of shaped articles such as films, sheets, panels, and the like fabricated from alkenyl aromatic resins with a lacquer prepared from copolymers of vinylidene chloride and acrylonitrile.

The invention is particularly adapted to be practiced with swellable, integral, solid styrene polymer film or sheets. Such a polymer, which may have an essentially linear molecular configuration or be in a cross-linked form, is employed herein as being generally representative of alkenyl aromatic compounds of the type that contain at least about 50 weight percent of at least one polymerized alkenyl aromatic compound or monomer having the general formula: $Ar—CR=CH_2$, wherein R is hydrogen or methyl and Ar is an aromatic radical, advantageously of the benzene series, of from 6 to 10 carbon atoms (including the carbon atoms in any ring substituents on the aromatic nucleus). Thermoplastic polymers and copolymers of styrene and polymers and copolymers of alpha-methyl styrene, ar-methyl styrene (or vinyl toluene), the several mono- and di-chlorostyrenes and ar-dimethyl styrenes, including copolymers thereof with such materials as vinylidene chloride and acrylonitrile; cross-linked polyfunctional substances as divinyl benzene; and graft copolymers with other polymeric substances (such as other elastomeric polymers) may frequently be utilized with benefits commensurate with or in excess of those which are derivable from employment of polystyrene alone.

Vinylidene chloride-acrylonitrile copolymer coatings are particularly desirable and advantageous because of their high chemical resistance and exceptionally low permeability to various gases and vapors.

In the past, attempts to apply acrylonitrile-vinylidene chloride copolymers by means of lacquer systems to shaped articles fabricated from alkenyl aromatic resins has been notably unsuccessful. There has been no solvent known to dissolve a vinylidene chloride-acrylonitrile copolymer which was not also a strong solvent for an alkenyl aromatic resin. Subsequently, attempts to apply vinylidene chloride-acrylonitrile copolymers from such a lacquer system resulted in a severe solvent attack on the alkenyl aromatic resin substrate frequently causing crazing, warping, solution, or general destruction of the desirable surface properties of the substrate.

Benefits and advantages of a vinylidene chloride-acrylonitrile copolymer coating on an alkenyl aromatic resin substrate could only be obtained if some suitable means were employed to protect the substrate from either lacquer solvent during its application or by applying the vinylidene chloride-acrylonitrile copolymer from a latex system. Both techniques are somewhat disadvantageous as, in the case of a latex coating, adhesion to the substrate is difficult to obtain and the coating is contaminated by wetting agents and other additaments which are necessary to prepare the aqueous dispersion of the coating polymer. An aqueous dispersion usually does not have long term shelf stability and is subject to a gradual change in characteristics due to decomposition and slow agglomeration of the dispersed particles. If a protective base coat is applied to an alkenyl aromatic substate prior to the application of a lacquer system, a double coating operation is required which is economically disadvantageous.

It is an object of this invention to provide a lacquer composition suitable for the coating of shaped objects prepared from alkenyl aromatic resins.

It is a further object of this invention to provide a method of coating shaped objects prepared from an alkenyl aromatic resin.

It is a further object of this invention to provide a method of coating a shaped article prepared from an alkenyl aromatic resin with a coating comprising a vinylidene chloride-acrylonitrile copolymer.

These benefits and other advantages may be obtained by treating the surface of a shaped article prepared from an alkenyl aromatic resin with a solution comprising a copolymer of from about 15 to 25 percent by weight acrylonitrile and 85 to 75 percent by weight vinylidene chloride in a volatile solvent comprising ethyl glycolate and subsequently removing said volatile solvent therefrom.

The drawing shows a flow sheet representing the steps of the invention.

The vinylidene chloride-acrylonitrile copolymer employed in the practice of the invention may be prepared by any of the conventional and well-known methods of polymerization such as emulsion, suspension, solution and mass or bulk polymerization.

The ethyl glycolate employed in the practice of the invention advantageously may be admixed with a minor portion (i.e., up to about 35 percent by weight) of another solvent such as acetone, methyl ethyl ketone, dimethyl formamide, tetrahydrofuran, ethyl acetate and the like. In cases where such a diluent or secondary solvent is employed which could attack the alkenyl aromatic resin alone, its vapor pressure should be equal to or greater than the vapor pressure of ethyl glycolate at the same temperature. If the vapor pressure of the secondary or diluent solvent is less than that of ethyl glycolate, the concentration of the secondary solvent in the solvent mixture often will increase as evaporation takes place and frequently attack the alkenyl aromatic substrate.

Usually it is beneficial to maintain at least about 65 percent by weight of the total solvent employed in the lacquer as ethyl glycolate, and, frequently, it is advantageous to employ about 90 percent by weight of the total solvent as ethyl glycolate.

The use of minor portions of solvents other than in admixture with ethyl glycolate frequently will improve the adhesion of the vinylidene chloride-acrylonitrile copolymer to the alkenyl aromatic substrate. Usually, for conventional purposes the adhesion of the coating is adequate without the dilution of the lacquer system with a mutual solvent for both polymers. When extremely thin films or sheets of polystyrene or like alkenyl aromatic resinous articles are being coated, it is advantageous to maintain a relatively high portion of ethyl glycolate in the lacquer solvent in order to avoid solvent attack and deformation of the thin substrate.

The lacquer mixture may readily be prepared by dissolving solid vinylidene chloride-acrylonitrile copolymers and ethyl glycolate by any conventional methods such as agitating a suspension of the polymer and solvent at room temperature, by heating in combination with agitation and the like. Advantageously, in cases where time is not a significant factor, the solvent and copolymer may be placed in the same vessel and allowed to stand until complete solution takes place. The concentration of copolymer in solvent will vary with the particular coating method employed and characteristics of the copolymer used. Usually the copolymer will be about 10 to 20 percent by weight of the total lacquer mixture.

Lacquers comprising ethyl glycolate and acrylonitrile-vinylidene chloride copolymers are readily applied to shaped articles prepared from alkenyl aromatic resins by conventional means, such as spraying, brushing, dipping, rolling, and the like. Generally, it is advantageous to apply a lacquer at a temperature of from about 20–40° C. when employing manual techniques. By using automatic coating equipment temperatures up to and exceeding the heat distortion point of the alkenyl aromatic resin may be employed, that is, up to about 100° C.

By way of further illustration, a copolymer of acrylonitrile and vinylidene chloride was prepared by copolymerizing 20 parts of acrylonitrile and 80 parts of vinylidene chloride in an aqueous solution of sodium dihexyl sulphosuccinate. The aqueous polymerization medium employed containing as polymerization catalysts about 0.5 percent of potassium persulphate based on monomer and about 2.5 percent sodium dihexyl sulphosuccinate based on monomer was placed in a closed reactor and heated to a temperature of about 45° C. A monomer mixture consisting of 20 parts by weight of acrylonitrile and 80 parts by weight vinylidene chloride was added to the aqueous solution at a rate equal to the polymerization rate until about 50 percent polymer solids were obtained in the reaction mixture. The monomer mixture was added over a period of about 20 hours. On completion of the polymerization the resultant polymeric dispersion was coagulated by the addition of aluminum sulfate, the coagulum filtered, washed with water, and dried in a convection oven at 50° C. Fifteen parts by weight of the dried copolymer were added to 85 parts by weight of ethyl glycolate and agitated at a temperature of 50° for a period of 2 hours. A clear transparent lacquer resulted. The acrylonitrile-vinylidene chloride copolymer-ethyl glycolate lacquer was spread on a sheet of polystyrene about 1 mil in thickness. The lacquer coated polystyrene substrate was dried at a temperature of 60° C. for a period of 45 minutes. The resultant coated sheet or film was clear and showed no evidence of crazing or distortion.

In a similar manner other alkenyl aromatic resins may be coated with vinylidene chloride-acrylonitrile copolymers prepared from monomer mixtures containing from 15 to 25 percent by weight acrylonitrile and 85 to 75 percent by weight vinylidene chloride.

As is apparent, the method is susceptible of being embodied with various alterations and modifications from that which is being described in the preceding description and specification. For this reason, it is to be understood that all of the foregoing is merely intended to be illustrative and is not to be construed or interpreted as being restrictive or otherwise limitative of the present invention except as set forth in the appended claims.

What is claimed is:

1. A method of coating a shaped article comprising treating the surface of a shaped article prepared from an alkenyl aromatic resin having chemically combined in its polymer molecule at least about 50 weight percent of at least one polymerized alkenyl aromatic compound having the general formula:

$$Ar\text{---}CR\text{=}CH_2$$

wherein "R" is selected from the group consisting of hydrogen and methyl and "Ar" is an aromatic group of the benzene series and the group ---$CR\text{=}CH_2$ is attached directly to the aromatic ring with a solution comprising a copolymer of from about 15 to 25 percent by weight acrylonitrile and 85 to 75 percent by weight vinylidene chloride in a volatile solvent comprising ethyl glycolate and subsequently removing the volatile solvent therefrom.

2. The method of claim 1, wherein said alkenyl aromatic resin is polystyrene.

3. The method of claim 1, wherein said shaped article is a film about 1 mil in thickness.

4. The method of claim 1, wherein said solvent consists of ethyl glycolate.

5. The method of claim 1, wherein said solvent is about 65 percent by weight ethyl glycolate.

No references cited.